April 29, 1924.

M. SHOEMAKER

MACHINE FOR TREATING LIVE STOCK

Filed May 11, 1923  2 Sheets-Sheet 1

M. Shoemaker, Inventor

April 29, 1924.
M. SHOEMAKER
MACHINE FOR TREATING LIVE STOCK
Filed May 11, 1923      2 Sheets-Sheet 2
1,492,142
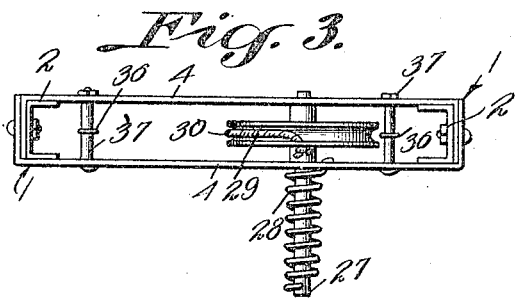
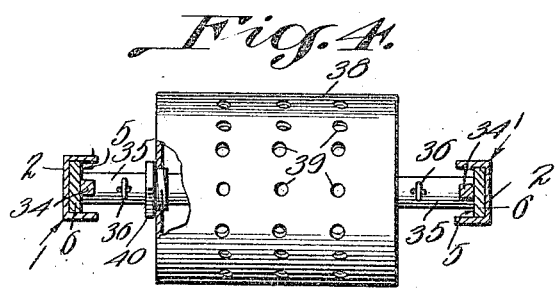
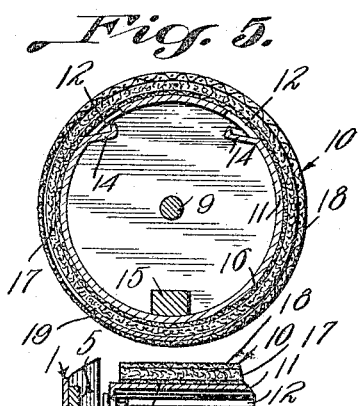
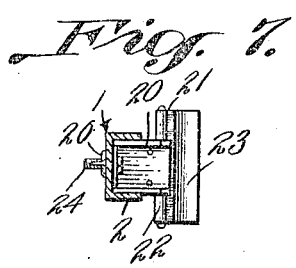
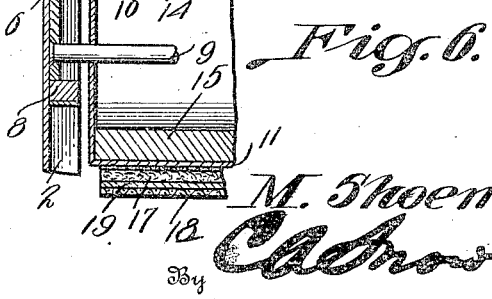
Inventor
M. Shoemaker
By
Attorney Patented Apr. 29, 1924.

1,492,142

UNITED STATES PATENT OFFICE.

MURRY SHOEMAKER, OF ARTESIAN, SOUTH DAKOTA.

MACHINE FOR TREATING LIVE STOCK.

Application filed May 11, 1923. Serial No. 638,253.

*To all whom it may concern:*

Be it known that I, MURRY SHOEMAKER, a citizen of the United States, residing at Artesian, in the county of Sanborn and State of South Dakota, have invented a new and useful Machine for Treating Live Stock, of which the following is a specification.

This invention aims to provide a simple means whereby a liquid or liquid and powder, may be applied to an animal, the device being automatically adjustable to the height of the animal.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood, that, within the scope of what is claimed, changes in the precise embodiment of the invention shown can be made without departing from the spirit of the invention.

In the accompanying drawings:—

Figure 1:
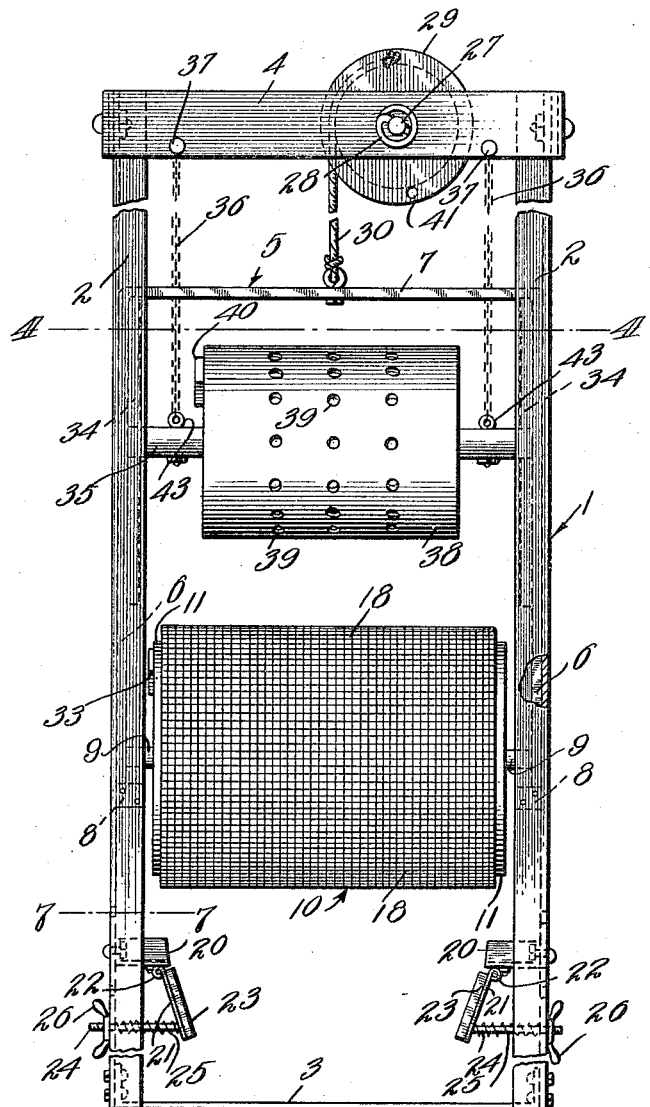
Figure 2:
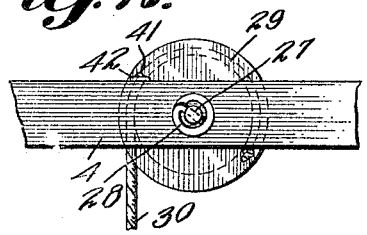

Figure 1 shows in elevation, a device constructed in accordance with the invention; Figure 2 is a fragmental section illustrating the means whereby the sheave may be held against rotation; Figure 3 is a top plan, remote parts being omitted; Figure 4 is a section taken approximately on the line 4—4 of Figure 1; Figure 5 is a cross section taken through the lower drum; Figure 6 is a fragmental longitudinal section taken through the lower drum and a portion of the frame; Figure 7 is a cross section taken approximately on the line 7—7 of Figure 1.

In carrying out the invention, there is provided a frame which is denoted generally by the numeral 1. The frame 1 may be of any desired construction, but, ordinarily, it embodies channel-shaped sides 2 which may be connected by a base 3. The sides 2 of the frame 1 are united at their upper ends by a loop-shaped bead 4. A slide 5 of inverted U-shape is supplied, and embodies the side arms 6 and a top 7, the side arms 6 of the slide 5 being mounted for reciprocation in the sides 2 of the frame 1. Buffers 8, which may be resilient, are carried by the sides 2 of the frame 1 and limit the downward movement of the slide 5, through contact with the lower ends of the arms 6. The ends of a shaft 9 are mounted in the side arms 6 of the slide 5, the shaft carrying, rotatably, a drum, which is denoted generally by the numeral 10.

The drum 10 comprises a cylindrical metal shell 11, closed at its ends, one end of the shell carrying a plug 33, which, when removed, permits the pouring of liquid into the shell 11 of the drum. Adjacent to its top, the shell 11 of the drum 10 is equipped with longitudinal openings 12, the shell of the drum carrying inwardly projecting ladles 14, disposed below the openings 12. A weight 15 is located within the shell 11 at the lower part thereof, and serves to maintain the drum 10 normally in the position shown in Figure 5, the openings 12 being thus maintained at or near the top of the drum, as aforesaid. About the shell 11 of the drum is disposed a layer 16 of fabric, such as denim or the like. An absorbent pad 17 is placed about the fabric layer 16. The fabric layer 16 prevents the liquid in the shell 11 of the drum from flowing too readily into the pad 17 and effects a distribution of the liquid into the pad. The pad 17 is protected, by a covering 18 of netting, preferably wire netting. A trough 19 is disposed at the bottom portion of the drum and is located between the netting covering 18 and the pad 17, the weight 15 serving to keep the drum 10 in such a position that the trough 19 normally will be located at the bottom of the drum.

Inwardly projecting chutes 20 are secured to the sides 2 of the frame 1, arms 21 being hinged at 22 to the chutes 20, the arms bearing side pads 23. The inner ends of plungers 24 cooperate with the arms 21, the plungers being mounted for reciprocation in the sides 2 of the frame 1. Compression springs 25 surround the plungers and are located between the sides 2 of the frame 1 and the hingedly mounted arms 21, the springs serving to press the arms 21 and the pads 23 inwardly, inward swinging movement of the arms and the pads being adjustably limited through the instrumentality of nuts 26 which are threaded on the plungers 24, the nuts coacting with the sides 2 of the frame 1.

Noting that the weight 15 tends to hold the drum 10 normally in the position shown in Figure 5, any surplus liquid which may be in the pad 17 will find its way into the trough 19, the liquid flowing from the ends of the trough into the small chutes 20 and thence upon the side pads 23, the side pads being kept in a saturated condition. When an animal passes between the side pads 23, the sides of the animal are anointed by the pads 21, and the back of the animal receives treatment from the drum 10, the drum rotating to permit the animal to pass therebeneath. As the animal rotates the drum 10 the ladles 14 scoop a quantity of liquid from within the shell 11 and discharge the same through the openings 12 upon the pad 17. As soon as the animal passes from beneath the rotatable drum 10, the drum is restored to the position shown in Figure 5 by the action of the weight 15, the openings 12 then being disposed above the level of the liquid in the drum. When the animal passes beneath the drum 10, the drum rises, the slide 5 moving upwardly in the parts 2 of the frame 1. Thus, the structure is adapted for use for animals of different sizes, and the drum 10 always rests on the back of the animal.

With a view to relieving the animal of some of the weight of the drum 10 and the slide 5, a counterpoise means is provided, and having this consideration in mind, a shaft 27 is journaled for rotation in the loop-shaped head 4 of the frame 1, a torsion spring 28 being placed about one end of the shaft, one end of the spring being secured to the shaft, and the other end of the spring being secured to the head 4. There is a sheave 29 on the shaft 27 and about the sheave, a flexible element 30 is trained, one end of the flexible element being secured to the sheave, and the other end of the flexible element being secured to the top 7 of the slide 5. The operation of the counterpoise means thus provided, will be understood readily when Figures 2 and 1 of the drawings are examined. It may be desirable to hold the slide 5 and parts carried thereby in an elevated position. To accomplish this result, a hole 41 is formed in the edge of the sheave 29 and through this opening is inserted a cotter pin 42 or the like, the same cooperating with the upper edge of the head 4, as shown in Figure 2, to hold the sheave 29 against rotation and to prevent the slide 5 from moving downwardly.

The drum 10 is intended primarily for the application of liquid to the animal, but in the event that it is desired to apply powder as well, to the animal, recourse is had to an upper drum 38 journaled on a support or bar 35 interengaged for vertical sliding movement with guides 34 carried by the side arms 6 of the slide 5. Any suitable means, however, may be supplied for mounting the support 35 slidably on the side arms 6 of the member 5. The drum 38 has perforations 39 and is equipped at one end with a removable plug 40, permitting the insertion of material into the drum. Flexible elements 36 are connected at their upper ends as at 37 with the head 4, the lower ends of the flexible elements being detachably engaged with eye bolts 43 or the like, mounted in the support 35.

When it is not desired to apply powder to the hog or other animal, the upper drum 38 is held suspended by the flexible elements 36, in vertically spaced relation to the drum 10, as depicted in Figure 1. When, however, it is desired to powder the animal, the flexible elements 36 are detached from the eye bolts 43, the support 35 sliding downwardly until the drum 38 rests on the drum 10. Then, when the drum 10 is rotated as aforesaid, the drum 38 will be rotated likewise and powder will be sifted through the perforations 39 of the drum 38 upon the drum 10, the drum 10 serving to apply the powder to the animal.

What is claimed is:—

1. A device of the class described comprising a frame, a slide mounted for reciprocation in the frame, a drum journaled on the slide, a rotatable member journaled on the frame, a torsion spring connected with the rotatable member and with the frame, and a flexible element connected to the rotatable member and to the slide.

2. A device of the class described comprising a frame, a slide mounted for reciprocation in the frame, a drum journaled on the slide, a rotatable member journaled on the frame, counterpoise means assembled with the rotatable member for off-setting the weight of the slide and the drum, a flexible element connected with the slide and with the rotatable member, and means for holding the rotatable member against rotation, at the will of an operator, thereby to hold the slide and the drum elevated.

3. In a device of the class described, a frame, a slide mounted for reciprocation on the frame, a lower drum journaled on the slide, an upper drum, means for mounting the upper drum for sliding movement into and out of contact with the lower drum, and for rotation with the lower drum, and means for holding the upper drum releasably out of contact with the lower drum.

4. A device of the class described comprising a frame, upper and lower drums, means for mounting the drums for rotation, in contact with each other, and for sliding movement, together, on the frame, and means for holding the upper drum out of contact with the lower drum.

5. A device of the class described comprising a drum having an opening, means for mounting the drum for rotation and for vertical movement, means for counterpoising the drum so that the opening normally stands at a point adjacent to the top of the drum, a trough carried by the drum and located at the bottom of the drum when the opening is disposed at a point adjacent to the top of the drum, and a side-applying member whereon the trough discharges.

6. A device of the class described, a drum comprising a shell having an opening, a fabric distributer about the drum and extended across the opening, an absorbent pad surrounding the distributer, a netting covering surrounding the pad, and means for mounting the drum for rotation.

In testimony that I claim the foregoing as my own, I have hereto affixed my signature in the presence of two witnesses.

MURRY SHOEMAKER.

Witnesses:
T. M. BRISBINE, Jr.,
M. A. BROWN.